(12) United States Patent
Benner et al.

(10) Patent No.: US 7,724,733 B2
(45) Date of Patent: May 25, 2010

(54) INTERCONNECTING NETWORK FOR SWITCHING DATA PACKETS AND METHOD FOR SWITCHING DATA PACKETS

(75) Inventors: Alan Frederic Benner, Poughkeepsie, NY (US); Cyriel Johan Agnes Minkenberg, Adliswil (CH); Craig Brian Stunkel, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 11/095,269

(22) Filed: Mar. 31, 2005

(65) Prior Publication Data

US 2006/0221948 A1    Oct. 5, 2006

(51) Int. Cl.
*H04L 12/28* (2006.01)

(52) U.S. Cl. .................. 370/389; 370/236; 370/413

(58) Field of Classification Search .......... 370/388, 370/389, 395.41–395.43, 412–419, 230, 370/231, 236; 398/45, 50; 718/102–105; 713/503
See application file for complete search history.

(56) References Cited

U.S. PATENT DOCUMENTS

| | | | | |
|---|---|---|---|---|
| 5,396,491 A * | 3/1995 | Newman | ................ | 370/355 |
| 5,786,917 A * | 7/1998 | Maeno | ................ | 398/51 |
| 5,787,072 A * | 7/1998 | Shimojo et al. | ............. | 370/231 |
| 5,838,684 A * | 11/1998 | Wicki et al. | ................ | 370/416 |
| 5,872,769 A * | 2/1999 | Caldara et al. | .............. | 370/230 |
| 5,892,766 A * | 4/1999 | Wicki et al. | ................ | 370/412 |
| 5,896,516 A * | 4/1999 | Powell et al. | ............... | 710/317 |
| 6,052,375 A * | 4/2000 | Bass et al. | ................ | 370/412 |
| 6,078,565 A * | 6/2000 | Ben-Michael et al. | ....... | 370/236 |
| 6,667,984 B1 * | 12/2003 | Chao et al. | ................ | 370/414 |
| 6,795,442 B1 * | 9/2004 | Clayton et al. | ......... | 370/395.41 |
| 7,263,066 B1 * | 8/2007 | Yun et al. | ................ | 370/236 |
| 7,292,595 B2 * | 11/2007 | Hachinota | .................. | 370/415 |
| 2001/0050916 A1 * | 12/2001 | Krishna et al. | ............. | 370/419 |
| 2004/0160970 A1 * | 8/2004 | Dally et al. | ................ | 370/412 |
| 2004/0223454 A1 * | 11/2004 | Schober et al. | ............. | 370/229 |
| 2005/0094645 A1 * | 5/2005 | Sridhar et al. | .......... | 370/395.42 |

* cited by examiner

*Primary Examiner*—Aung S Moe
*Assistant Examiner*—Vinncelas Louis

(57) ABSTRACT

The interconnecting network for switching data packets, having data and flow control information, comprises a local packet switch element (S1) with local input buffers (I(1,1) ... I(1,y)) for buffering the incoming data packets, a remote packet switch element (S2) with remote input buffers (I(2,1) ... I(2,y)) for buffering the incoming data packets, and data lines (L) for interconnecting the local and the remote packet switch elements (S1, S2). The interconnecting network further comprises a local and a remote arbiter (A1, A2) which are connected via control lines (CL) to the input buffers (I(1,1) ... I(1,y), I(2,1) ... I(2,y)), and which are formed such that they can provide that the flow control information is transmitted via the data lines (L) and the control lines (CL).

17 Claims, 4 Drawing Sheets

INTERCONNECTING NETWORK FOR SWITCHING DATA PACKETS AND METHOD FOR SWITCHING DATA PACKETS

This invention was made with Government support under Contract No.: OSMOSIS B 527064 awarded by the U.S. Department of Energy. The Government has certain rights in this invention.

TECHNICAL FIELD

The present invention relates to an interconnecting network for switching data packets and a method for switching data packets in an interconnecting network comprising input-buffered switch elements.

BACKGROUND OF THE INVENTION

Multi-stage scaling of interconnection networks has long been used in circuit switching, where contention-free paths through the network are set up and torn down on a per-connection basis, eliminating the need for buffers in the fabric. Although this approach can in principle also be applied to packet switching, as the network capacity grows in terms of ports and link rate, it quickly becomes infeasible to compute and apply contention-free network configurations within the duration of a single packet. Therefore, buffered switch elements are more suitable as a building block for packet-switched networks. The traditional approach is to use switch elements with individual output buffers per output port or with a shared memory which functions as a shared output buffer for multiple output ports.

A well-known, traditional approach to build large packet-switched interconnection networks out of smaller building blocks is by arranging a number of packet switch elements in a multi-stage topology, such as a Banyan, Benes, Clos, Fat Tree, Hypercube, or Torus. FIG. 1, for example, shows a two-level interconnection network of packet switch elements S1 to S6 that are interconnected in a Fat Tree topology, which utilizes bidirectional links L. The end nodes N1 to N8 of the interconnection network are located at the bottom of the tree. Each packet switch element S1 to S6 routes a data packet from an ingress or input port IP to one or more egress or output ports OP. The full network of interconnected packet switch elements S1 to S6 is capable of routing packets from any of the end nodes N1 to N8 (shown at the bottom of the network) to any of the other end nodes N1 to N8.

In general, the two-level Fat Tree topology lets an N-port switch element support a network of $\frac{1}{2}*N^2$ end nodes, with full bisection bandwidth. In FIG. 1 the two-level packet-switched interconnection network comprises switching elements S1 to S6 with N=4 ports and with that supports a network with $\frac{1}{2}*N^2=8$ end nodes N1 to N8. Other topologies may allow more or fewer end nodes to be interconnected, with more or less bandwidth between end nodes.

In the packet-switched interconnection network shown in FIG. 1 the basic packet switch elements S1 to S6 can be constructed in a variety of ways, but all packet switch elements S1 to S6 incorporate means for routing packets from ingress ports IP to egress ports OP. For example, in FIG. 2, the packet switch element S1 comprises the routing fabric R1. Furthermore, a multi-stage packet-switched interconnection network comprises links L for interconnecting the packet switch elements S1 to S6 to end nodes N1 to N8 and to other packet switch elements S1 to S6. In addition, the packet switch elements S1 to S6 comprise input packet buffers I(1,1) to I(6,4) and output packet buffers O(1,1) to O(6,4), which are located at the ingress ports IP and the egress ports OP of the packet switch elements S1 to S6 respectively. Additionally, to arrange such a packet switch element S1-S6 in a multi-stage topology and avoid uncontrollable packet loss due to input or output buffer overruns, each packet switch element S1 to S6 comprises some means for controlling the flow of packets between subsequent stages or packet switch elements.

Traditional packet switch elements have buffers at the ingress ports IP and as well at the egress ports OP of the fabric as shown in FIG. 2. This allows straightforward, point-to-point link-level flow control between the egress buffers O(n, x) of stage n and the ingress buffers I(n+1,y) of stage n+1. Flow control information is transmitted in the direction opposite to the direction of the packet flow. Assuming that all links L are bidirectional, the flow control information can be transmitted in-band, on the same links L used for transmitting the data packets in the reverse direction, i.e., from stage n+1 to stage n. In this context in-band transmission means that the flow control information is transmitted over the links L and not over the control lines CL.

FIG. 2 furthermore illustrates a local flow control loop FC1 and a remote flow control loop FC2 in the interconnection network comprising input buffers I as well as output buffers O. This type of switch element structure may be termed "Combined Input- and Output-queued" (CIOQ). Typically, the input and output buffers I and O of the same port P physically reside on the same line card.

As an example of how a remote flow control loop operates in such a CIOQ packet switch element, consider the remote flow control loop FC2 between port P4 of packet switch element S1 and port P2 of packet switch element S2. The flow control information is generated by the input buffer I(2,2), e.g., by the release of a credit or assertion of a stop signal because of the crossing of a threshold. The input buffer I(2,2) passes this information internally to the output buffer O(2,2), which inserts the flow control information in the header of a data packet traveling via link L to the input buffer I(1,4), or injects an idle packet if there is no data packet. The input buffer I(1,4) extracts the flow control information from the header of the received data packet and passes it internally to the output buffer O(1,4), which performs the flow control bookkeeping, e.g. incrementing the available credit or (re-) setting an on/off (start/stop) flag.

The expression available credit shall be understood as a counter value which indicates how many packets can be received from a transmitter without losing data. That is, the available credit represents the size of the buffer space of the receiving buffer. Therefore, the higher the available credit of a certain receiving buffer is, the more data packets said receiving buffer can receive without data loss. By communicating the available credit, the receiving buffer can inform a transmitter about how much data the transmitter can still send without causing a buffer overflow.

Changes in the available credit of a receiving buffer, e.g. owing to the departure of a packet, can be communicated by absolute credits, indicating the absolute size of the available buffer space, or by incremental credits, which indicate only the change in the size of the available buffer space. An incremental credit comprises a credit count, indicating the magnitude in the change of the available credit, and optionally an identifier indicating the receiving buffer. The transmitter maintains a credit counter that reflects the available credit of the corresponding receiving buffer. Upon receipt of an incremental credit this counter is incremented according to the indicated value. Upon transmission of data, it is decremented according to the size of the transmitted data.

The expression on/off (also referred to as start/stop) flow control denotes a command with which a data packet transmission from an output buffer to input buffer or from an input buffer via a packet switch element to an output buffer is started (on) or stopped (off).

Pertaining to a switch element S under consideration, the expression "local" shall be understood as pertaining to the same switch element S, e.g., in FIG. 2, routing fabric R1, arbiter A1, input buffers $I(1,1) \ldots I(1,4)$, and output buffers $O(1,1) \ldots O(1,4)$ are all considered local with respect to switch element S1.

Pertaining to a switch element S under consideration, the expression "remote" shall be understood as pertaining to a switch element connected to the switch element S via one or more links L. E.g., in FIG. 2, output buffer $O(2,2)$, as a part of switch element S2, is considered remote with respect to switch element S1.

The above mentioned switch and network designs are described in Chapter 2 of Andrew Tanenbaum, "Computer Networks", Prentice Hall PTR, 2002, and in Chapter 1 of Jose Duato, Sudhakar Yalamanchili, Lionel Ni, "Interconnection Networks", Morgan Kaufmann, 2002.

SUMMARY OF THE INVENTION

The object of the invention is to provide an interconnecting network and a method for switching data packets wherein the number of data buffers is reduced. It is a more particular object to reduce the use of output buffers.

According to one aspect of the invention, the object is achieved by an interconnecting network for switching data packets with the features of the independent claim 1.

The interconnecting network according to the invention for switching data packets, having data and flow control information, comprises a local packet switch element with local input buffers for buffering the incoming data packets, a remote packet switch element with remote input buffers for buffering the incoming data packets, and data lines for interconnecting the local and the remote packet switch elements. The interconnecting network further comprises a local and a remote arbiter which are connected via control lines to the input buffers, and which are formed such that they can provide that the flow control information is transmitted via the data lines and the control lines.

According to another aspect of the invention, the object is achieved by a method for switching data packets an input-buffered interconnecting network with the features of the independent claim 11.

The method according to the invention for switching data packets having data and flow control information in an input buffered interconnecting network, comprising a local packet switch element which is input buffered by local input buffers, and a local arbiter connected to the local input buffers, a remote packet switch element which is input buffered by remote input buffers, and a remote arbiter connected to the remote input buffers, comprises the following steps: First, the local arbiter which receives a flow control information from one of the local input buffers checks whether the flow control information comprises a credit. Then, in the event that the flow control information comprises a credit, the credit is routed to the remote arbiter, and finally, the remote arbiter provides that the data are transmitted to the local input buffer.

Advantageous further developments of the invention arise from the characteristics indicated in the dependent patent claims.

Preferably, in the interconnecting network according to the invention the local arbiter is provided for managing the remotely generated flow control information which it receives from the local input buffers and for relaying the locally generated flow control information to remote input buffers.

In an embodiment of the interconnecting network according to the invention the local arbiter is provided for storing flow control information regarding the available buffer space of the remote input buffers, and the local arbiter is provided for checking whether the available buffer space of one of the remote input buffers is sufficient for receiving a data packet from one of the local input buffers.

In a further embodiment of the interconnecting network according to the invention the local arbiter is formed such that it supplies those remote input buffers with the flow control information from those local input buffers to which they could send data packets.

Over and above this, in the interconnecting network according to the invention the local arbiter can be formed such that it supplies those local input buffers with the flow control information from those remote input buffers to which they could send data packets.

In an alternative embodiment of the interconnecting network according to the invention the local arbiter is provided to decide to which one of the input buffers the flow control information is forwarded.

In a further embodiment of the interconnecting network according to the invention the packet switch element is an optical packet switch element.

Furthermore, in the interconnecting network according to the invention the input buffer can comprise an optical-electrical converter followed by an electrical buffer and an electrical-optical converter.

Over and above this in the interconnecting network according to the invention the input buffer can be formed such that it can generate as flow control information a credit value indicating whether it is able to receive data.

In another aspect of the interconnecting network according to the invention the arbiter is formed such that it relays acknowledgements indicating that the data have been correctly received.

An embodiment of the method according to the invention can comprise the following further steps:

In the event that the flow control information comprises no credit, an idle message is transmitted to the corresponding arbiter.

This step is repeated until the flow control information comprises a credit.

In another embodiment of the method according to the invention that input buffer which is ready to receive data generates a credit and transmits it to its arbiter via a control line.

Advantageously, in the method according to the invention the arbiter decides to which of the input buffers the credit is forwarded.

Finally, in a further embodiment of the method according to the invention the arbiter relays an acknowledgement indicating that the data have been received correctly. With that, it can be ensured that loss of data is detected immediately.

Additional objects and advantages of the invention will be set forth in the description which follows, and in part will be obvious from the description, or may be learned by practice of the invention.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

Figure 1:
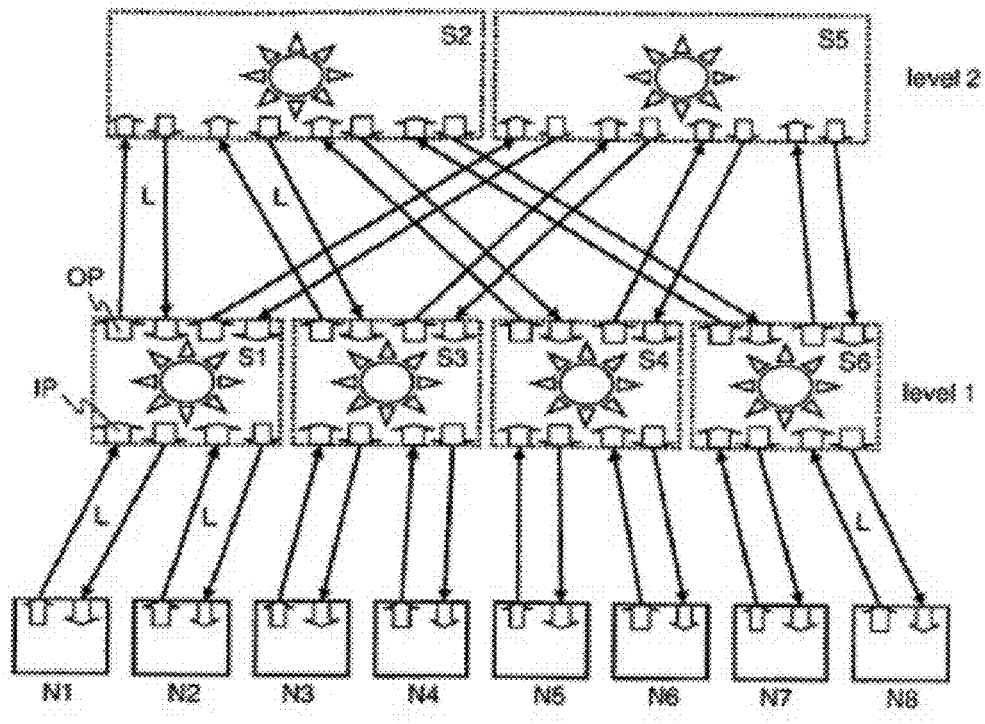
FIG. 1 a block diagram of a two-level packet-switched interconnection network having a Fat Tree topology, FIG. 2 a block diagram of a part of a combined input- and output-queued interconnection network according to the prior art, FIG. 3 a block diagram of part of a packet-switched interconnection network according to the invention, FIG. 4 the block diagram of the interconnection network from FIG. 3 additionally with arrows indicating individual steps for executing the flow control, FIG. 5 an example for an input buffer usable for the packet-switched interconnection network according to the invention, and FIG. 6 an example for an arbiter usable for the packet-switched interconnection network according to the invention.
Figure 2:
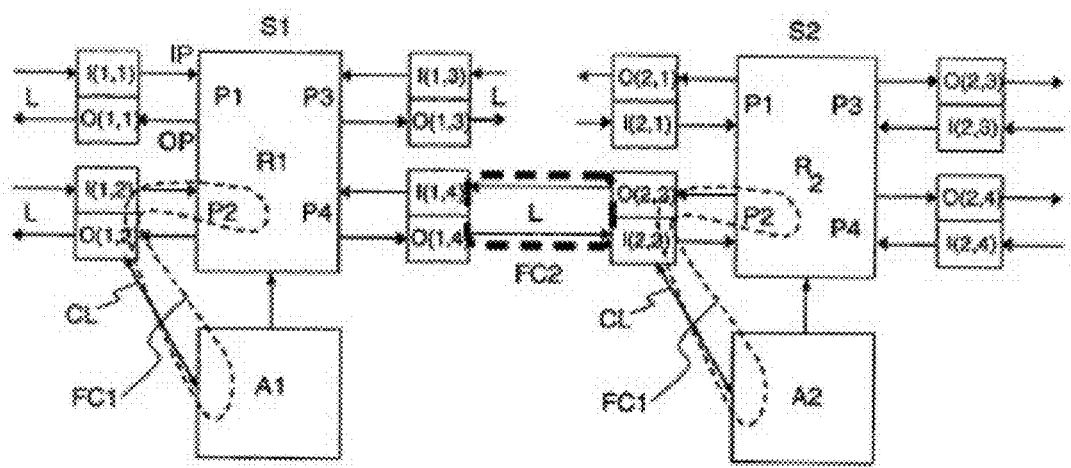

The description of the FIGS. 1 and 2 can be found in the section "Background of the invention".

The method according to the invention allows flow control between Input Queued (IQ) packet switch elements. In this method, flow control information between switching stages or packet switch elements is transmitted in-band, i.e., the flow control information is transmitted over the same links that are used for data transmission and for control of the routing function of the packet switch elements.

Furthermore, the invention allows a flow control mechanism that enables concatenation of packet switch elements without output buffers. Between switching stages, the proposed method operates in-band; that is, it uses no additional control links between stages or switch elements, but instead transports flow control information on the same links used for regular data and control traffic, without interfering with data traffic or causing loss of performance.

Although this method can be applied to any type of packet switch, it is especially advantageous to packet switches which use optical switching means, due to the significant hardware savings in buffers and optical/electrical/optical conversions deriving from removal of the output buffers.

The invention proposed is particularly suitable for crossbar-based switches as packet switch elements S1 to Sn, which include switches with an optical routing fabric, as optical buffers are currently not practically feasible in an economical fashion. The key property of a crossbar is that at any time an input can only be connected to one output and vice versa, i.e., there is a one-to-one matching between inputs and outputs. To obtain better performance in terms of latency and throughput, this matching is typically computed by a centralized arbitration unit, also called arbiter A, for example arbiter A1 and arbiter A2 in FIG. 3. In general, the arbiter A receives requests from the input buffers, where a request comprises an output port identifier, meaning that the input buffer that originated the request wishes to transmit a packet to this specific output port of the switch element. Based on the received requests, the arbiter A computes a suitable one-to-one matching between input and output ports, which is equivalent to a bipartite graph matching problem. Based on the computed matching, the arbiter A then returns the corresponding grants to the input buffers, where a grant comprises an output port identifier, meaning that the input buffer receiving this grant is allowed to transmit a packet to the output port specified by the output port identifier. The arbiter A also applies the computed matching to the crossbar routing fabric, which routes the data packets to their destinations. Every input buffer is connected to an arbiter A with a dedicated bidirectional control link L, which carries the requests and grants.

There are three major types of flow control that can be applied to regulate the data flow from one stage or one switch element to the next without any packet loss, namely on/off flow control, credit flow control, and rate-based flow control. On/off flow control uses twice the buffer space compared to credit flow control for a given round-trip time, and rate-based flow control is more complex to implement. Therefore, credit flow control is preferably used. Specifically, incremental credit flow control, which communicates changes in the number of available credits, rather than absolute credit counts, is preferred because incremental credit flow control has much lower overhead. However, the invention is independent of the particular type of flow control used.

In the invention, the interconnecting network is constructed without output buffers. That is, a packet switch element has buffers only on the input side of the switch element. This avoidance of output buffers removes significant cost from the switch element structure, as it removes half the cost of buffering.

This avoidance of output buffers is particularly significant in the case of optical packet switches, which use optical switching means for routing of the packets. In the specific case of such optical packet switch elements, a combined input- and output-queued approach incurs significant additional cost, aside from the cost of the additional buffers. Optical buffering technology is currently not practically or economically feasible, so these buffers are realized as electronic buffers. As a result, in an embodiment of the invention optical-to-electrical (O/E) converters, electronic buffers, and electrical-to-optical (E/O) converters are implemented in the input links. The avoidance of output buffers removes the cost and power of half of the O/E and E/O conversions, as well as the output buffering itself.

Figure 3:
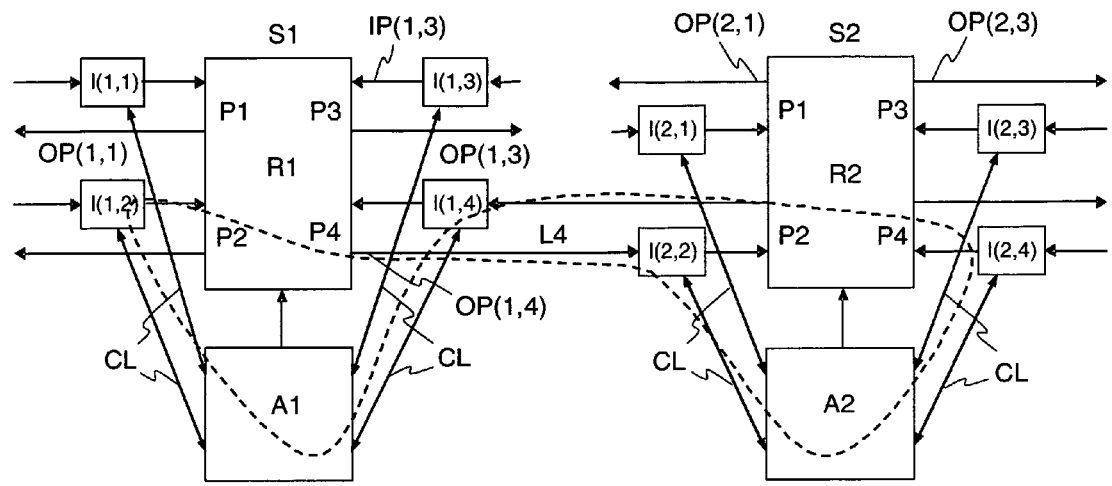

Avoiding the output buffering leads to a modified design. FIG. 3 illustrates how omitting the output buffers influences the flow control:

First, instead of a point-to-point flow control on the links L connecting two packet switch elements, a point-to-multipoint flow control is set up. For example, every port P1 to P4 of the packet switch element S1 should be aware of the state of the flow control of the input buffer I(2,2), i.e., instead of a one-to-one sender to receiver relation for a given input buffer, there is now a many-to-one relation.

Secondly, flow control information can no longer be piggybacked directly on the reverse link, because packets are no longer buffered on the output side of the packet switch elements.

In the prior art in FIG. 2, first one of the ports P1 to P4 of the packet switch element S1 transmits a packet to the output buffer O(1,4) as regulated by the local flow control loop FC1. Then the packet is forwarded to the input buffer I(2,2) of the packet switch element S2 as regulated by the remote flow control loop FC2. In FIG. 3 on the contrary, packets are transferred directly from the input buffers of the packet switch element S1 to the input buffers of the packet switch element S2, without intermediate output buffers. In this new architecture, there is no direct path to pass the flow control information from an input buffer of the packet switch element S2 back to an input buffer of the packet switch element S1.

The architecture of the packet switch elements in the interconnecting network according to the invention comprises electrical buffers at the ingress, a routing fabric which may be optical or electrical (typically a crossbar), and an electrical centralized arbitration unit or arbiter A to configure the routing fabric. The multi-stage arrangement is assumed to be bidirectional; that is, there are both forward and reverse data paths or links L between each two adjacent packet switch elements.

Consider as shown in FIG. 3 two connected packet switch elements S1 and S2, with arbiters A1 and A2 respectively, input ports labeled IP(1,1) through IP(2,4) and output ports labeled OP(1,1) through OP(2,4). Both packet switch elements S1 and S2 are connected by at least one pair of ports P, wherein a single port P comprises one input port IP and one output port OP. For example in FIG. 3 the input and output ports IP(1,4), and OP(1,4), are connected to the input and output ports IP(2,2), OP(2,2), i.e., there is a bidirectional data path or link between ports P(1,4) and P(2,2). Input buffers I(1,1) to I(2,4) are located at each of the input ports IP(1,1) to IP(2,4), whereas there are no buffers at the output ports OP(1,1) to OP(2,4).

In the following it is described by means of an example how flow control information is passed from one input buffer to another. The example refers to the transportation of the flow control information from the input buffers of the packet switch element S2 to the input buffers of the packet switch element S1.

The first step is to eliminate the passing of the flow control information all the way back to the input buffers of the packet switch element, e.g. S1. Instead, all flow control information is forwarded to and maintained by the corresponding arbiter A, in this case the arbiter A1. To this end, control channels CL between the input buffers I(1,1) to I(1,4) of the packet switch element S1 and the arbiter A1 are provided. The control channel CL forwards incoming flow control information, e.g. incremental credits, from the inputs of the input buffers I(1,1) to I(1,4) to the arbiter A1. The arbiter A1 maintains one credit counter C(Py) for every output port OP(1,y). This credit counter C(Py) represents the number of available credits for the input buffer I(2,y') at the receiving side of output port OP(1,y). For example, in FIGS. 3 and 4 output port OP(1,4) corresponds to input buffer I(2,2) of the packet switch element S2. If a credit arrives for output port OP(1,4), the credit counter C(P4) is incremented. The arbiter A1 will only issue a grant for a specific output port OP(1,y) if the credit of the credit counter C(Py) is higher than 0. When a grant is issued, the corresponding credit counter C(Py) is decremented. Maintaining the credits in the arbiter A1 has two advantages:
1. The credits do not need to be passed explicitly to the input ports. Instead, flow control is applied implicitly by the arbiter A by ignoring requests for ports that have no credit.
2. All input ports can share the available credits for a given output port. Otherwise, the available credits would be distributed over all input ports, but the arbiter A cannot know in advance which input port will need how many credits. To solve this, every input port would then use individual credits for the output port, rather than allocating credits to input ports through granting of requests.

The above method can be called implicit flow control, because the credits are not explicitly handed out to the inputs, but are instead implicitly assigned with the issuance of a grant.

The operational details are as follows:
Some input buffer I(2,p) of the packet switch element S2 releases a credit. This credit is relayed back to the arbiter A1 to enable a future packet transmission to the input buffer I(2,p). Therefore, the input buffer I(2,p) sends the credit via its control channel CL to the arbiter A2. The arbiter A2 then relays the credit to one of the input ports IP(2,x) via the corresponding control channel. This selection is done as follows: Suppose that output port OP(2,y) connects the packet switch element S2 to the packet switch element S1 (as switch element S2 and switch element S1 are connected, such a y exists). There are two possible cases depending on the presence of a grant for output port OP(2,y) at the same time:
a) arbiter A2 issues a grant to some input buffer I(2,x) to transmit a packet to output port OP(2,y), or
b) arbiter A2 does not grant any input buffer to transmit a packet to output port OP(2,y).

In case a), the arbiter A2 piggybacks the credit for the input buffer I(2,p) on this grant to input buffer I(2,x). Upon receiving the grant and credit, input buffer I(2,x) dequeues a waiting packet for output port O(2,y), inserts the credit for input buffer I(2,p) into this packet's header, and sends it to the routing fabric R2. The routing fabric R2 routes the packet to output port O(2,y) from which the packet proceeds to input buffer I(1,y'). Finally, the input buffer I(1,y') relays the credit via its control channel CL to the arbiter A1.

In case b), there is at least one input buffer I(2,x') which does not receive a grant, owing to the one-to-one mapping implied by the crossbar matching algorithm. The arbiter A2 sends an "idle grant" to this input buffer I(2,x'), including the credit for the input buffer I(2,p). Upon receiving the "idle grant" and credit, input buffer I(2,x') injects an idle packet for output port OP(2,y), inserts the credit for input buffer I(2,p) into this packet's header, and sends it to the routing fabric R2. The routing fabric R2 routes the packet to output port OP(2,y) from which it proceeds to input buffer I(1,y'). Finally, input buffer I(1,y') relays the credit via its control channel CL to the arbiter A1. By introducing these idle grants, relaying credits in-band does not interfere with regular data traffic and no user throughput is lost, which is a significant advantage of the proposed method and architecture.

In the following, the flow control for the case that the input buffer I(2,2) of switch element S2 releases a credit is described. The reference signs st1 to st8 in FIG. 4 correspond to the following steps:

step st1:
   The input buffer I(2,2) dequeues a packet and releases the credit to the arbiter A2 via the control line CL.
step st2:
   The arbiter A2 routes the credit to the input buffer I(2,4).
step st3:
   The input buffer I(2,4) piggybacks the credit on a packet for output port OP(2,2) and sends the packet to routing fabric R2, which routes it to the output port OP(2,2).
step st4:
   The packet arrives at the input buffer I(1,4).
step st5:
   The input buffer I(1,4) sends the credit to the arbiter A1 via the control line CL.
step st6:
   The arbiter A1 stores the credit. Upon a granted request for output port OP(1,4) from the input buffer I(1,2), arbiter A1 consumes the credit and issues the corresponding grant.
step st7:
   The input buffer I(1,2) injects the packet to the output port OP(1,4).
step st8:
   The packet arrives at the input buffer I(2,2);
   go to step st1.

Note that p may be equal to x or x', in which case the detour via the arbiter might have been prevented. Specifically, if the input I(2,p) is about to send a packet to the output port OP(2,y), it can immediately insert the credit into this packet's header. In practice, this is not very likely, because this packet has arrived from switch element S1 and sending it to the output port O(2,y) will take it back there. In case there are multiple choices for y, any can be selected. It does not matter through which input port the credits arrive at switch element S1, as all credits are relayed to arbiter A1. The pairing of credits to be relayed with grants can always be solved, using idle grant as described above.

An important advantageous feature of the proposed method and architecture is that the round-trip latency of the flow control is deterministic (in the absence of errors/faults), allowing proper dimensioning of the buffers.

Assuming that there is one input buffer per link L, there are never more credits to return from the packet switch elements S2 to S1 than there are links, so that all released credits can always be returned at the same time without contention.

Acknowledgments

An acknowledgment (ACK) is a control information sent by the receiver of a packet to inform the sender of the packet that the packet has arrived correctly and without errors. This way, the sender can be sure which packets have successfully made it to their destination. This supports reliable delivery, which is advantageous in many packet switching applications. A negative acknowledgment (NAK) is the opposite of an ACK: it informs the sender that the packet arrived with a transmission error in it. Use of NAKs can improve the speed of error recovery, although a separate error recovery mechanism, depending on return of ACKs within a timeout period, is still used due to the possibility of corruption on NAKs.

The in-band flow control mechanism described above can also be used to convey ACK/NAK information in-band. Typically, an ACK is returned when a packet arrives at the input interface of an input buffer. As the packet switch element has N ports, up to N ACKs can be generated in one time slot, all of which are returned simultaneously.

As with the return of credits, there exists a one-to-one correspondence between the ACKs and the ports of the switch element. Every ACK is returned on the output link that is paired with the input link that the packet arrived on. As with the credits, the ACKs are forwarded first to the arbiter A. The arbiter A matches up the grants to be issued with the credits and ACKs to be returned, such that there is a one-to-one matching with every credit and ACK being routed to the correct packet switch element. Note that a credit and an ACK can be treated as a unit, because they are sent to the same output link; therefore, returning the ACKs poses no additional constraints on the pairing up of credits/ACKs and grants. Then, the credits/ACKs piggyback on the grants back to a local input buffer, which forwards them in-band to their destination. The receiving input buffer forwards the credit and ACK to the local arbiter, which does the bookkeeping for the credits and routes the ACKs to the right input buffer.

Owing to the crossbar operation, arriving ACKs correspond to packets that were sent from different inputs of the same switch. Therefore, there is no ACK contention and the arbiter can immediately return all ACKs to their originating input buffers. There can only be contention in routing the ACKs back to the input buffers, i.e., multiple incoming ACKs simultaneously go to the same input buffer, if the time delays between different switches or ports are different. In this case, the arbiter performs some queuing of ACKs, or additional bandwidth on the control path from arbiter to input buffers to return ACKs is used.

In other details of operation, return of ACKs is handled similar to return of flow control information, and follows the same path through the interconnecting network.

Figure 4:
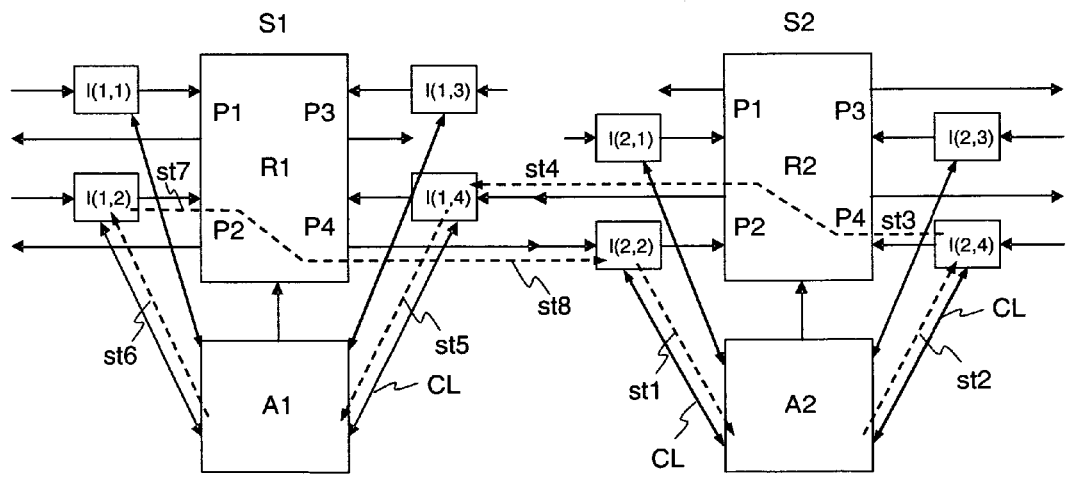
Figure 5:
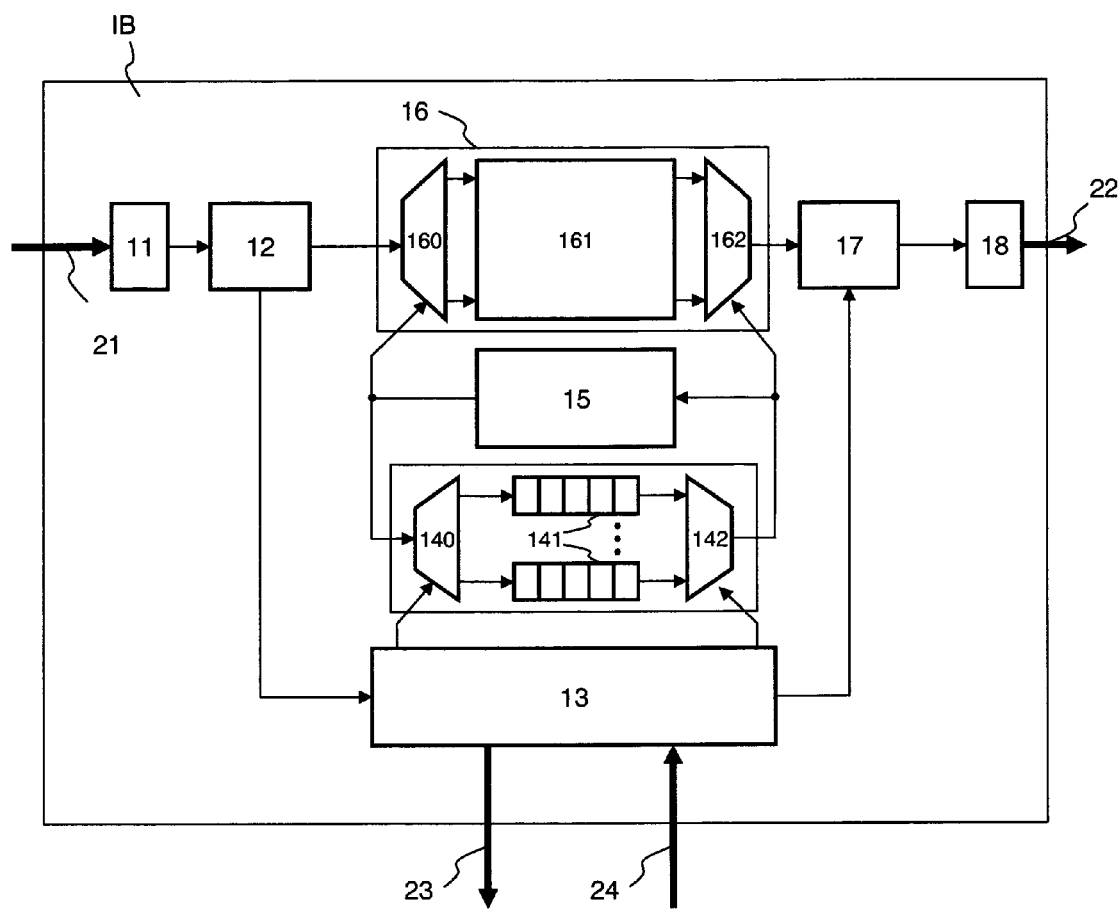

In FIG. 5 a possible embodiment of an input buffer IB is depicted which is usable in the interconnecting network shown in FIG. 4. The input buffer receives data packets on optical input link 21. Opto-electrical converter 11 converts the data packet into the electrical domain. Reception unit 12 passes the header information of the packet to the control unit 13 and forwards the packet to packet storage unit 16. Address manager 13 issues a free memory address that configures packet memory router 160 to store the packet at the indicated memory address in packet memory 161; simultaneously, this address is stored in one of a plurality of virtual output queues (VOQ) 141 via queue input router 140, which is configured by control unit 13 according to the destination output port indicated in the packet header.

The control unit 13 issues a request for arbitration via control link 23 for every packet, the request indicating the requested output port, and it receives grants via control link 24, the grant indicating the granted output port. If the received packet header comprises a remote credit, this credit is relayed to the arbiter via control link 23.

Upon receiving a grant, the control unit 13, triggers the corresponding queue 141 to dequeue an address via queue output router 142. The address is returned to address manager 15 for reuse while simultaneously triggering the release of the corresponding packet stored at the corresponding address from the packet memory 161 via packet memory output router 162. If the grant is accompanied by a credit, the credit is inserted in the header of the outgoing packet by transmission unit 17. If the grant is an idle grant (with credit), no packets are dequeued, but control unit 13 triggers transmission unit 17 to insert an idle packet with a header that comprises the credit to be relayed.

When the packet has been dequeued, control unit 13 releases a credit via control 23, indicating the release of a packet memory location.

Transmission unit 17 forwards the packet to electro-optical converter 18, which converts the packet to the optical domain and transmits it on output link 22. Note that input link 21 and output link 22 together form one link L.

Figure 6:
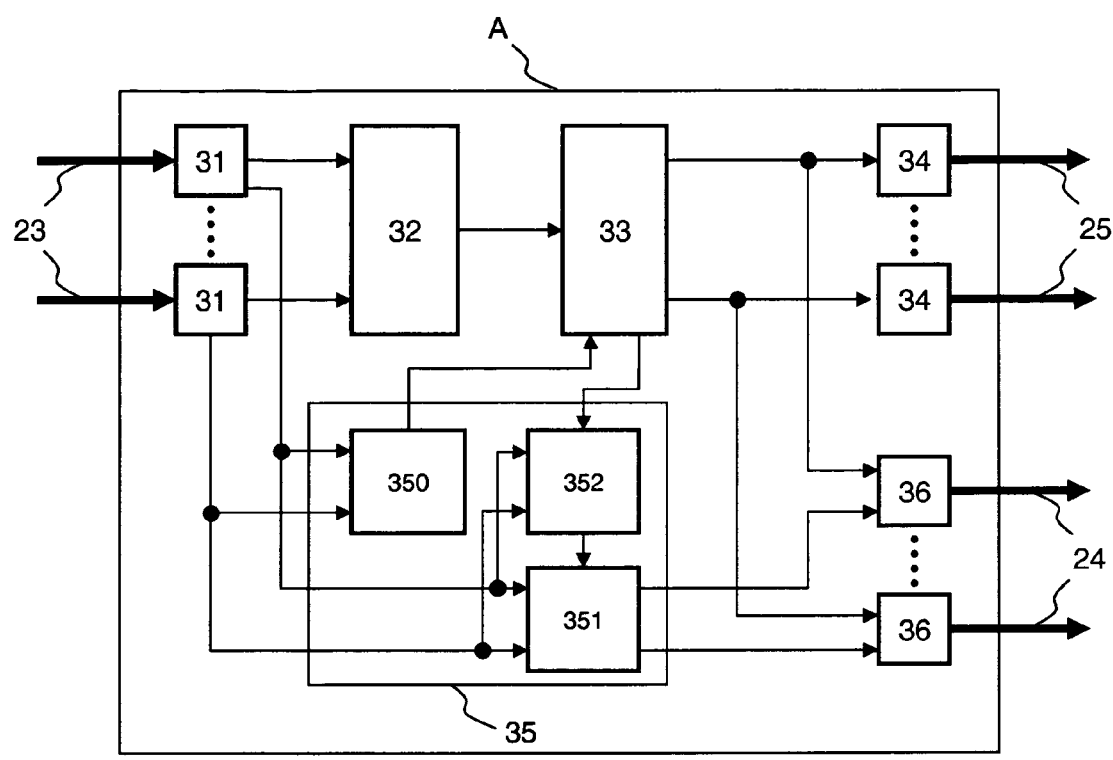

In FIG. 6 a possible embodiment of an arbiter A is depicted which is usable in the interconnecting network depicted in FIG. 4 as arbiter A1 or A2. Via a plurality of control links 23, the arbiter A receives control messages comprising local credits (to be relayed), remote credits (to be stored), and/or requests for arbitration. Upon reception of a control message, control message reception unit 31 forwards a request, if present, to VOQ status unit 32, forwards a local credit, if present, to credit router 351, and forwards a remote credit, if present, to credit counter unit 350.

The VOQ status unit 32 keeps tracks of the status of all virtual output queues 141 of all input buffers. It provides this status to matching unit 33, which computes a one-to-one matching between input and output ports based on this information and on the available credit information provided by the credit counters 350.

Matching unit 33 provides the matching computed
    to the routing fabric configuration units 34, which apply the configuration information to the routing fabric via control links 25,
    to the control message transmission units 36, which compute grants depending on the matching information and send control messages comprising these grants to their associated input buffers via control links 24, where a control message unit 36 corresponding to input buffer I(1,x) issues a grant for output port OP(1,y) if and only if input x is matched to output y in the matching computed by the matching unit 33, to the credit pairing unit, which pairs locally released credits with the current matching such that every credit is paired up with a, possibly idle, grant for the output O(1,y) it should be relayed to.

Credit pairing unit 352 applies the resulting logical pairing to credit router 351 such that the credits arrive at the correct control message transmission unit 36.

The control message transmission unit 36 associated with input buffer I(1,x) assembles a control message, comprising a grant for input buffer I(1,x), if present, and a credit to be relayed, if present. As the grant and the credit are associated with the same output port OP(1,y), a control message comprises this identifier only once.

Having illustrated and described a preferred embodiment for a novel method and apparatus for, it is noted that variations and modifications in the method and the apparatus can be made without departing from the spirit of the invention or the scope of the appended claims.

GLOSSARY OF REFERENCE SIGNS

| | |
|---|---|
| S1 | first switching element |
| S2 | second switching element |
| S3-S6 | further switching elements |
| st1-st8 | Step 1 to step 8 |
| N1-N8 | end node 1 to end node 8 |
| L | link |
| CL | control line |
| IP | ingress or input port |
| OP | output port |
| P1-P4 | port 1 to port 4 |
| A | arbiter |
| A1 | arbiter 1 |
| A2 | arbiter 2 |
| IB | input buffer |
| 11 | optical to electrical conversion |
| 12 | reception unit |
| 13 | control unit |
| 14 | queuing unit |
| 140 | queue input router |
| 141 | virtual output queues (VOQs) |
| 142 | queue output router |
| 15 | address manager |
| 16 | packet storage unit |
| 160 | packet memory input router |
| 161 | packet memory |
| 162 | packet memory output router |
| 17 | transmission unit |
| 18 | electrical to optical conversion |
| 21 | input data link (optical) |
| 22 | data link to routing fabric (optical) |
| 23 | control link from input buffer to arbiter |
| 24 | control link from arbiter to input buffer |
| 25 | control link to routing fabric (crossbar) |
| 31 | control message reception unit (x N) |
| 32 | VOQ status unit |
| 33 | matching unit |
| 34 | routing fabric configuration unit (x N) |
| 35 | credit management unit |
| 350 | credit counters (remote credits) |
| 351 | credit router (local credits) |
| 352 | credit pairing unit |
| 36 | control message transmission unit (x N) |

The invention claimed is:

1. An interconnection network for switching data packets having data and flow control information, said network comprising:

a local packet switch element;
a plurality of local input buffers connected to the local packet switch element for buffeting incoming ones of said data packets;
a remote packet switch element;
a plurality of remote input buffers connected to the remote packet switch element for buffeting said incoming data packets;
data lines for interconnecting the local and the remote packet switch elements to the remote input buffers and the local input buffers, respectively;
a local arbiter connected via control lines to each of the local input buffers; and
a remote arbiter connected via control lines to each of the remote input buffers, wherein the local arbiter and the remote arbiter transmit said flow control information via the data lines and via the control lines, and wherein the local packet switch element provides flow control information corresponding to each of the local input buffers to the remote arbiter via the remote input buffers and the control lines connecting the remote arbiter to the remote input buffers, bypassing the remote packet switch element.

2. The interconnection network according to claim 1, wherein the local arbiter is provided for managing the flow control information which it receives from the local input buffers and for relaying said flow control information to remote input buffers.

3. The interconnection network according to claim 1, wherein the local arbiter stores available buffer space of the remote input buffers, and wherein the local arbiter causes checking as to whether the available buffer space of one of the remote input buffers is sufficient for receiving a data packet from one of the local input buffers.

4. The interconnection network according to claim 1, wherein the local arbiter supplies remote input buffers with said flow control information from local input buffers which send them data packets.

5. The interconnection network according to claim 1, wherein the local arbiter supplies local input buffers with said flow control information from remote input buffers which send them data packets.

6. The interconnection network according to claim 1, wherein the local arbiter decides to which one of the remote input buffers said flow control information is forwarded.

7. The interconnection network according to claim 1, wherein the packet switch element is an optical packet switch element.

8. The interconnection network according to claim 7, wherein the input buffer comprises an optical to electrical converter followed by an electrical buffer and an electrical to optical converter.

9. The interconnection network according to claim 1, wherein the input buffer generates, as flow control information, a credit value indicating whether the input buffer is able to receive data.

10. The interconnection network according claim 1, wherein the arbiter generates an acknowledgement in the event that the data packets are transmitted correctly.

11. A method for switching data packets in an input buffered interconnection network, which includes a local packet switch element which is input buffered by local input buffers, and a local arbiter connected to the local input buffers and the input buffered interconnection network, which also includes a remote packet switch element which is input buffered by remote input buffers, and a remote arbiter connected to the remote input buffers, and wherein said data packets have data and flow control information, the method comprising the steps of:

having the local arbiter which receives said flow control information from one of the local input buffers check whether said flow control information includes a credit, wherein upon a condition that said flow control information includes the credit, the credit is routed to the remote arbiter via the remote input buffer and bypassing the remote packet switch element, and the remote arbiter causes said data to be transmitted to the local input buffer, wherein the local arbiter and the remote arbiter maintain a credit counter for each of a plurality of output ports of the local packet switch element and the remote packet switch element, respectively.

12. The method of claim 11, further comprising the following steps: in the event that said flow control information includes no credit, an idle message is transmitted to the remote arbiter, and this step is repeated until said flow control information includes the credit.

13. The method of claim 11, wherein a local input buffer, which is ready to receive data, generates the credit and transmits it to its local arbiter via a control line.

14. The method of claim 11, wherein the local arbiter decides to which of the local input buffers the credit is forwarded.

15. The method of claim 11, wherein the local arbiter generates an acknowledgement in the event that the data are received correctly.

16. The interconnection network according to claim 1, wherein the interconnection network does not include an output buffet.

17. The interconnection network according to claim 1, wherein the local arbiter and the remote arbiter are not connected directly to an output port of the remote packet switch element.

* * * * *